(12) United States Patent
Saxena et al.

(10) Patent No.: US 8,069,155 B2
(45) Date of Patent: Nov. 29, 2011

(54) SECURING DBMS EVENT NOTIFICATIONS

(75) Inventors: Abhishek Saxena, San Jose, CA (US);
Neerja Bhatt, Mountain View, CA (US);
Daniel ManHung Wong, Palo Alto, CA (US); Jinqiang Han, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 12/350,055

(22) Filed: Jan. 7, 2009

(65) Prior Publication Data

US 2010/0174749 A1 Jul. 8, 2010

(51) Int. Cl.
G06F 7/00 (2006.01)
G06F 17/00 (2006.01)
G06F 7/04 (2006.01)
G06F 17/30 (2006.01)
H04N 7/16 (2011.01)

(52) U.S. Cl. .......................................... 707/698; 726/27
(58) Field of Classification Search .................. 707/698, 707/999.001; 726/27
See application file for complete search history.

(56) References Cited

U.S. PATENT DOCUMENTS

| | | | | |
|---|---|---|---|---|
| 6,052,785 A * | 4/2000 | Lin et al. | | 726/5 |
| 2003/0093680 A1 * | 5/2003 | Astley et al. | | 713/183 |
| 2006/0031316 A1 * | 2/2006 | Forstadius | | 709/206 |
| 2008/0172560 A1 * | 7/2008 | Hughes et al. | | 713/176 |
| 2008/0184029 A1 * | 7/2008 | Sims et al. | | 713/156 |
| 2008/0189772 A1 * | 8/2008 | Sims et al. | | 726/5 |

OTHER PUBLICATIONS

The Authoritative Dictionary of IEEE Standards Terms, Kim Breitfelder & Don Messina, 2000, 7th edition, pp. 505-506.*

* cited by examiner

*Primary Examiner* — Mohammad Ali
*Assistant Examiner* — Patrick Darno
(74) *Attorney, Agent, or Firm* — Shun Yao; Park, Vaughan, Fleming & Dowler LLP (57) ABSTRACT

One embodiment of the present invention provides a database server for securing database event notifications. The server includes a session key creation mechanism configured to create a session key when a client registers for an event, a storage mechanism configured to store the session key on the database server, a data accessing mechanism configured to access registration metadata to obtain the session key when the event occurs, a connection mechanism configured to establish a communication channel between the database server and the client, a mutual authenticating mechanism configured to using the session key to mutually authenticate the client and the database server during event notification, and an event notifying mechanism configured to send the event notification to the client.

30 Claims, 6 Drawing Sheets

SECURING DBMS EVENT NOTIFICATIONS

BACKGROUND

1. Field

The present disclosure relates to database event notifications. More specifically, the present disclosure relates to securing database event notifications using mutual authentication between database server and client.

2. Related Art

In a database, events can include changes made to database table entries and user account activities, such as creating a new user account or logging into an existing user account. A database management system (DBMS) provides infrastructure to allow a client to register for events of interest, and to allow a database server to send notifications to the client when those events occur in the database.

Once an event occurs in a database, the database server opens communication channels to clients, which may have been disconnected from the database, and sends event notifications via these communication channels. On the client side, while waiting, the client spawns a listener process to accept communication channels from the database server and to receive event notifications on these communication channels.

Currently, there is no mutual authentication between the database server that sends out event notifications and the client listener. The client is listening on an open port waiting for event notifications. Because the client does not authenticate communication channels for receiving event notifications from a database server, the client is vulnerable to buffer-overflow attacks from malicious users. Such attacks can crash the client or engage it in denial-of-service attacks, thus preventing notification delivery to legitimate registrations at the client. In addition, the client may also suffer from replay attacks. On the other hand, because the database server does not authenticate a client who is receiving event notifications, it is possible for a malicious user to pose as a legitimate client to receive unauthorized notifications.

Some database management systems, such as the Oracle relational DBMS (RDBMS), provide security options (e.g., Oracle Advanced Security Options (ASO)) to address these security concerns. However, many database client/server installations do not support ASO and still use conventional event notifications, such as Oracle Call Interface (OCI) notifications or Java Database Connectivity (JDBC) notifications. What is needed is a method that can provide an acceptable level of security for event notifications for database client/server installations that do not have these security options.

SUMMARY

One embodiment of the present invention provides a database server for securing database event notifications. The server includes a session key creation mechanism configured to create a session key when a client registers for an event. During operation, a storage mechanism stores the session key on the database server. A data accessing mechanism accesses registration metadata to obtain the session key when the event occurs. A connection mechanism establishes a communication channel between the database server and the client. A mutual authenticating mechanism uses the session key to mutually authenticate the client and the database server during event notification. Furthermore, an event notifying mechanism sends the event notification to the client.

In a variation on this embodiment, the database server includes an obfuscating mechanism configured to obfuscate the session key before storing it.

In a variation on this embodiment, the session key is stored in a system registration table.

In a variation on this embodiment, the mutual authenticating mechanism includes a first sending mechanism configured to send a first random number; a reversible hash function based on a registration ID which identifies the event registration, and a reversible hash function based on a database ID which identifies the database; and a receiving mechanism configured to receive from the client a response including an irreversible hash function based on both the session key and the first random number.

In a further variation, the response from the client further includes a second random number.

In a further variation, the mutual authenticating mechanism includes a second sending mechanism configured to send to the client a response including an irreversible hash function based on both the session key and the second random number.

One embodiment of the present invention provides a database client for securing database event notifications. The database client includes a session key receiving mechanism configured to receive a session key from a database server when the client registers at the database server for an event. During operation, a storage mechanism stores the session key on the client. A mutual authenticating mechanism uses the session key to mutually authenticate the client and database server during event notification. An event notification receiving mechanism receives the event notification from the database server.

In a variation on this embodiment, the session key is stored in an in-memory hash table on the client.

In a variation on this embodiment, the mutual authentication mechanism includes a first receiving mechanism configured to receive from the database server a first random number, a reversible hash function based on a registration ID which identifies the event registration, and a reversible hash function based on a database ID which identifies the database.

In a further variation on this embodiment, the mutual authentication mechanism includes a sending mechanism configured to send a second random number and an irreversible hash function based on both the session key and the first random number; and a second receiving mechanism configured to receive a response from the server including an irreversible hash function based on both the session key and the second random number.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a method for securing event notifications by mutual authentication between a database server and a database client. When a client first registers for event notification with a database server, a session key is generated and shared by both the client and server. This session key is stored at both the server and client. During subsequent event notification, the server and client use this session key to mutually authenticate each other. In this way, both the server and client can reduce the likelihood of middle-man attacks. Furthermore, the frequency and scope (e.g., per event notification, per registration, or per database) can be tailored according to different system needs and security levels. These features have not been available with existing technologies.

Computing Environment

Figure 1:
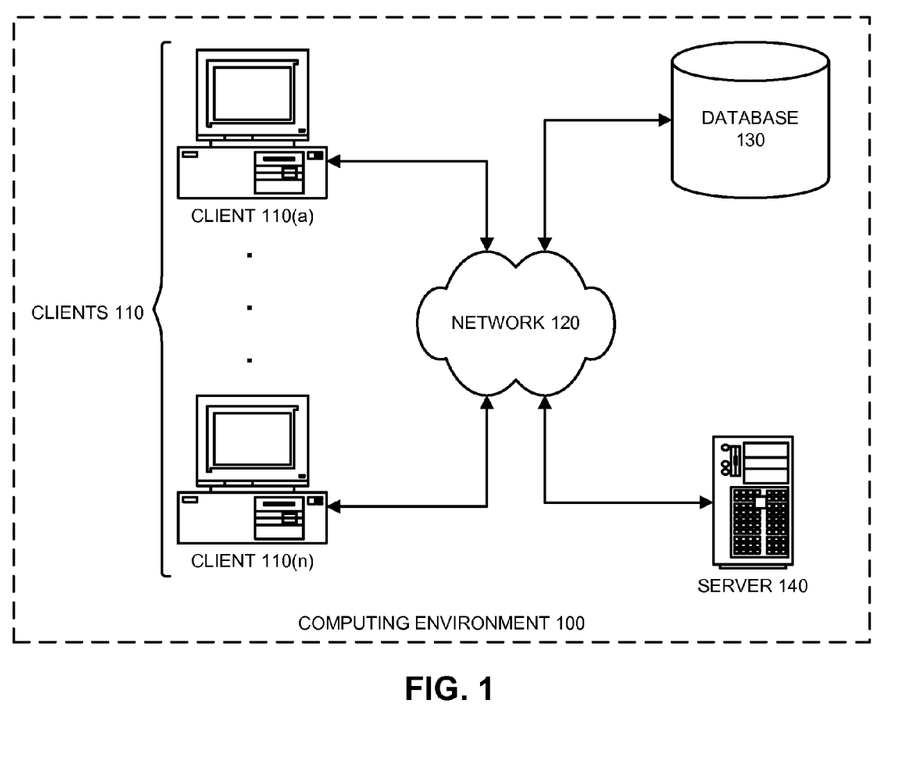
FIG. 1 illustrates an exemplary computing environment for securing database event notifications in accordance with one embodiment of the present invention.

FIG. 1 illustrates a computing environment 100 in accordance with an embodiment of the present invention. In the example illustrated in FIG. 1, computing environment 100 includes clients 110, network 120, database 130, and database server 140. During operation, clients 110 first registers with database server 140 to receive notifications of certain events in database 130. Such events can be any operation performed on database 130. During the registration process, server 140 generates a session key with a respective client. This session key is then shared with that client, and subsequently used to mutually authenticate both server 140 and that client when an event corresponding to the registration occurs at database 130.

Computing environment 100 can include any type of computer system, including, but not limited to, a computer system based on a microprocessor, a mainframe computer, a digital signal processor, a portable computing device, a personal organizer, a device controller, and a computational engine within an appliance. Clients 110 can include any nodes on a network with computational capability and a mechanism for communicating across the network.

Network 120 can include any type of wired or wireless communication channel capable of coupling together computing nodes. This includes, but is not limited to, a local area network, a wide area network, or a combination of networks. In one embodiment of the present invention, network 120 includes the Internet.

Database 130 can include any type of system for storing data in non-volatile storage. This includes, but is not limited to, systems based upon magnetic, optical, and magneto-optical storage devices, as well as storage devices based on flash memory and/or battery-backed up memory.

Database server 140 can generally include any computational node with a mechanism for providing database service to a client.

Figure 2:
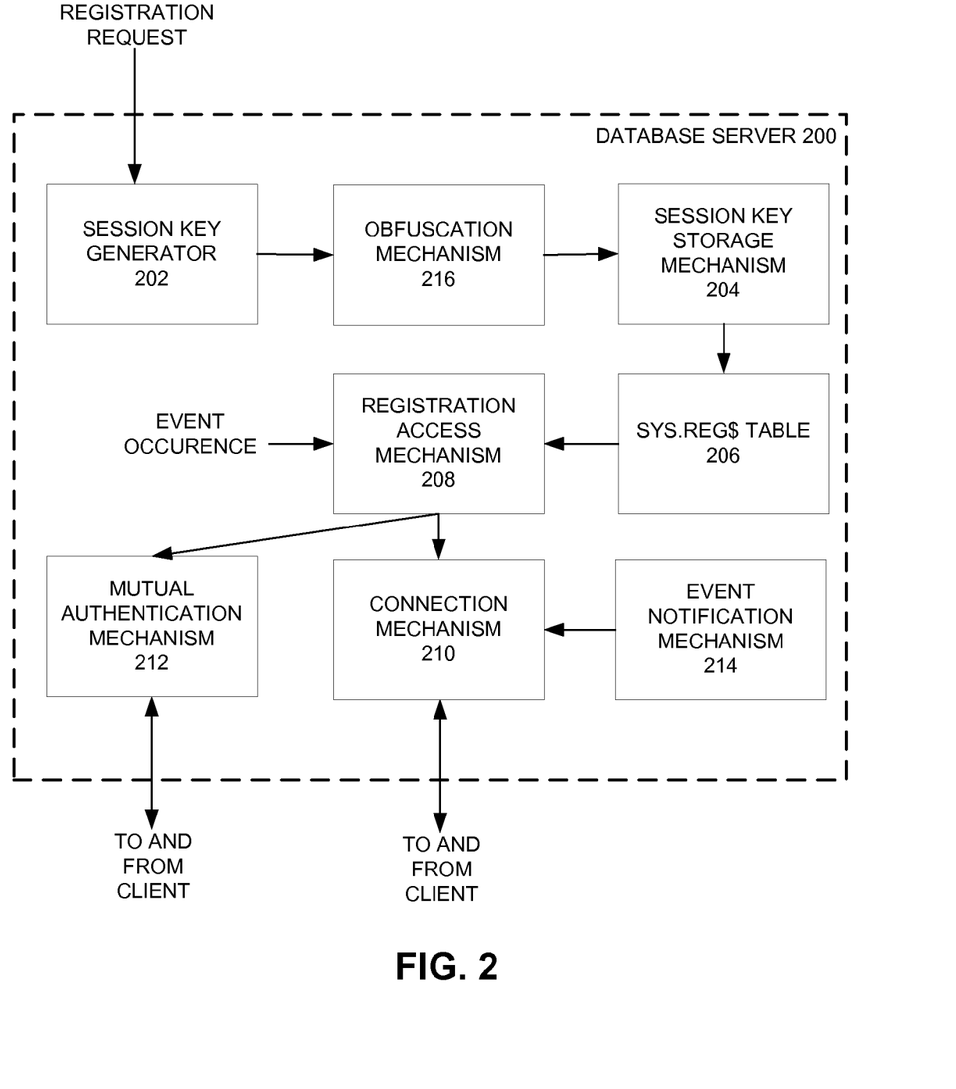
FIG. 2 presents a block diagram illustrating a database server for securing database event notification in accordance with one embodiment of the present invention.

FIG. 2 presents a block diagram illustrating a database server for securing database event notification in accordance with one embodiment of the present invention. As shown in FIG. 2, a database server 200 includes a session-key generator 202, a session-key storage mechanism 204, a system registration table 206, a registration-access mechanism 208, a connection mechanism 210, a mutual authentication mechanism 212, an event notification mechanism 214, and an obfuscating mechanism 216. When a client registers for an event at database server 200, session key generator 202 generates a session key. In one embodiment, the session key is an encryption and decryption key that is randomly generated to ensure the security of a communication session between a user and another computer or between two computers. Note that although conventionally a session key is a single-use symmetric key used for encrypting all messages in one communication session, embodiments of the present invention allows a session key to persist beyond the initial session and uses the session key to facilitate subsequent authentication tool between a database server and a client. Obfuscating mechanism 216 obfuscates the session key to prevent dictionary attack of the session key. Session key storage mechanism 204 then stores the obfuscated session key in system registration table 206. System registration table 206 stores the registration information. In one embodiment, system registration table 206 can be the sys.reg$ table in an ORACLE® database system, which is a database table within the database system that stores system registration information.

After the registered event occurs, registration-access mechanism 208 accesses system registration table 206 to obtain the session key. Connection mechanism 210 then establishes a communication channel with the client. Mutual authentication mechanism 212 mutually authenticates database server 200 and the client. That is, mutual authentication mechanism 212 challenges the client to prove that the client is a legitimate, registered event-notification receiver, and responds to the client's challenge. Subsequent to successful mutual authentication, event notification mechanism 214 sends event notifications to the client.

Figure 3:
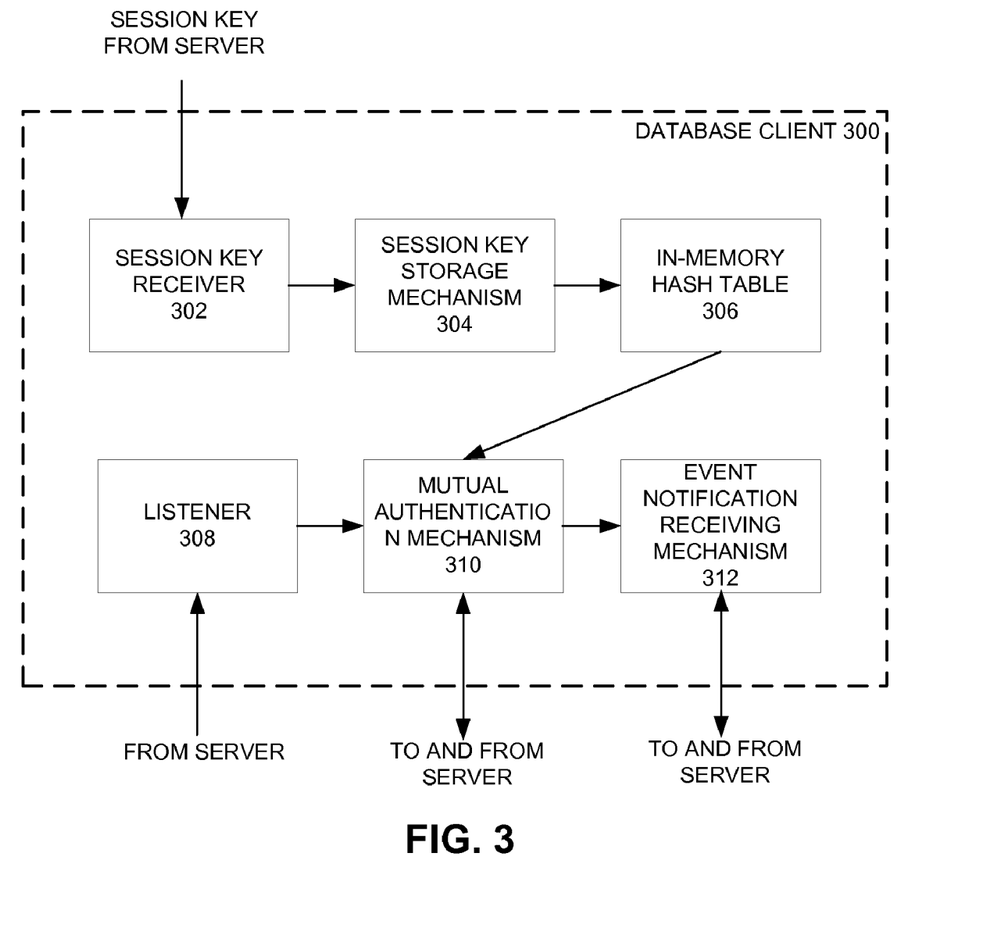
FIG. 3 presents a block diagram illustrating a database client for securing database event in accordance with one embodiment of the present invention.

FIG. 3 presents a block diagram illustrating a database client for securing database event in accordance with one embodiment of the present invention. As shown in FIG. 3, a database client 300 includes a session-key receiver 302, a session-key storage mechanism 304, an in-memory hash table 306, a listener 308, a mutual authentication mechanism 310, and an event notification receiving mechanism 312. During event registration, session-key receiver 302 receives a session key from the database server. Session-key storage mechanism 304 stores the session key in in-memory hash table 306. While waiting, database client 300 spawns a listener process 308 to accept communication channels from the database server for event notification. Mutual authentication mechanism 310 mutually authenticates the database server and client 300. Subsequent to successful mutual authentication, event notification mechanism 312 receives event notifications from the database server.

Event Registration

Figure 4:
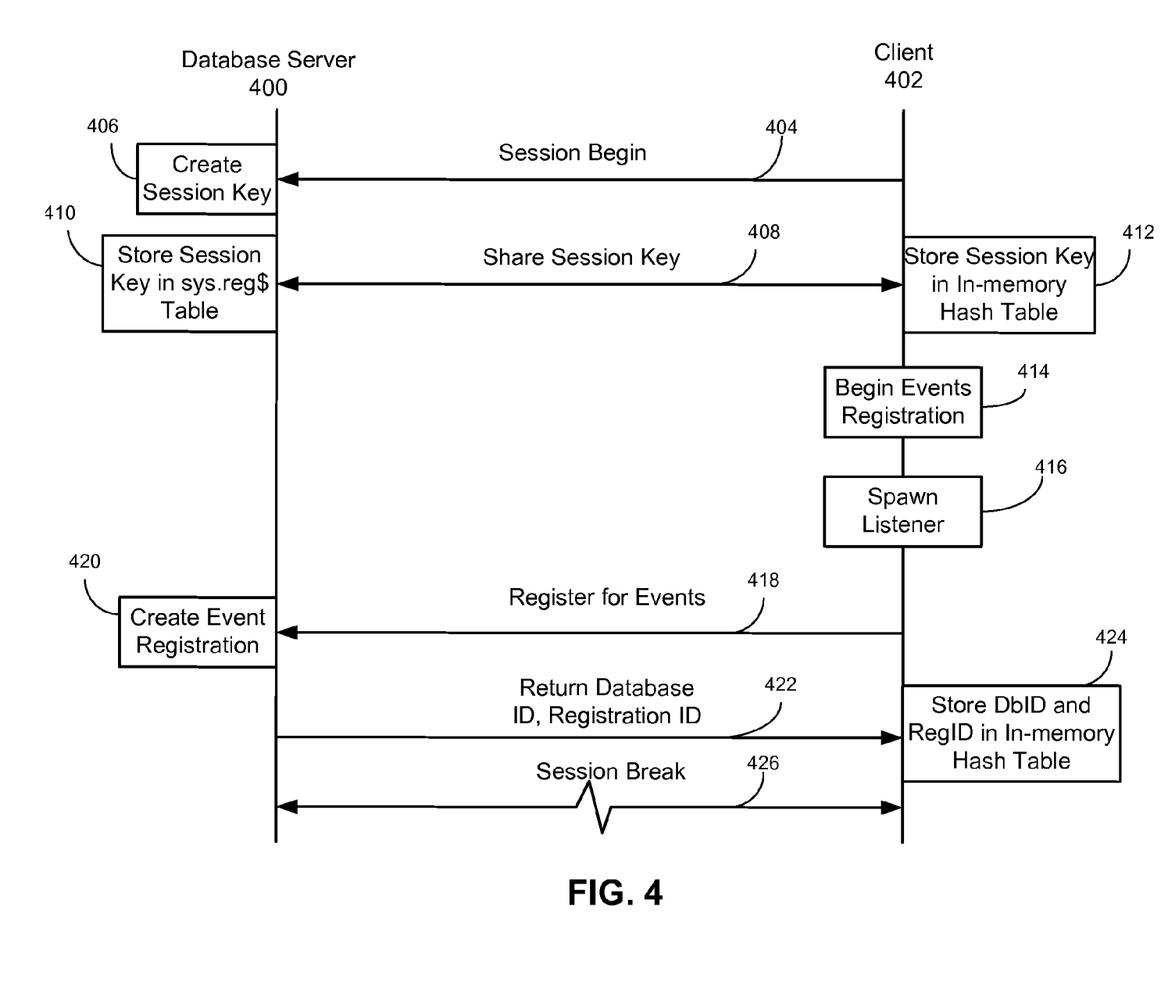
FIG. 4 presents an exemplary state diagram illustrating the process of registering an event in accordance with one embodiment of the present invention.

FIG. 4 presents a state diagram illustrating the process of registering an event in accordance with one embodiment of the present invention. During operation, a database client 402 starts a communication session with a database server 400 (operation 404). In one embodiment, database server 400 includes an Oracle EMON (event monitor) server. Upon starting the session, database server 400 creates a session key (operation 406) and shares the session key with the client (operation 408). In one embodiment, the session key is created based on the session's host definition, such as the client's IP address and the time at which the session is created. Database server 400 then stores the session key along with other registration metadata (operation 410). Such registration metadata may include subscriber name (name of the registered client), information regarding the server's callback function for notifying the client about events, identifier of the user who registered the client, and the namespace within which the event notification operates. Subsequently, client 402 stores the session key in an in-memory subscription hash table (operation 412).

In one embodiment, database server 400 stores the session key in a sys.reg$ data dictionary table, which stores registration information. Since the sys.reg$ table is stored in a non-volatile storage (e.g., hard drive), The storage of the session key in the registration table ensures the session key to be available for EMON background server process through subscription library cache object for sending notifications over authenticated communication channels. More over, because registration persists across database instance restarts (i.e., the registration remains effective after the database restarts), event notifications would continue to be sent after such instance restarts, and the corresponding session keys remain available after such instance restarts. This feature allows uninterrupted event notifications without the need of re-establishing session keys after instance restarts.

Because the sys.reg$ table can be queried by database administrator (DBA) and users, in one embodiment, database server 400 can obfuscate the session key before storing it in the sys.reg$ table. In another embodiment, for added security, database server 400 stores the session key in an auxiliary hidden table. In addition, database server 400 ideally does not return session key to client 402 in plain text, because the communication channel between database server 400 and client 402 may not be encrypted. In a further embodiment, client 402 also obfuscates the session key before storing the session key in its in-memory subscription hash table.

Note that an OCI or JDBC client program can have multiple registrations with a database due to its multiple users/sessions. Therefore, a client listener could be listening at a given host and port (or a given location) for notifications destined to multiple registrations on one or more communication channels from one or more database servers. Due to this 1:N mapping between listener location and registrations, the database server can store the session key either in the high-level location structure, or fine-grained context structure, of the subscription KGL (Kernel Generic Library cache) object.

After storing the session key, client 402 begins events registration (operation 414) and spawns a listener process (operation 416). Client 402 registers with database server 400 for events (operation 418). Within the event registration, client 402 specifies "where" (such as host and port information) and "how" (such as through a callback) the notifications are to be delivered. Upon receiving the registration call from client 402, database server 400 creates an event registration (operation 420) and returns a database ID (DbID) along with a registration ID (RegID) to the client (operation 422). The database ID distinguishes one database from other databases with which the client is in communications. Client 402 stores the database ID and the registration ID in the in-memory subscription hash table along with the session key (Skey) (operation 424). In one embodiment, client 402 can store one session key for all registrations with a respective database. As a result, database server 400 does not need to return a registration ID to client 402 because the same session key can be used for all the registered event notifications from database sever 400. Correspondingly, the client side in-memory subscription hash table contains tuples of the form <DbID, RegID, Skey> if a separate session key is used for each registration, or <DbID, Skey> if the same session key is used for all registrations in a database. After the client stores the database ID and the registration ID, the session can be discontinued (operation 426).

Figure 5:
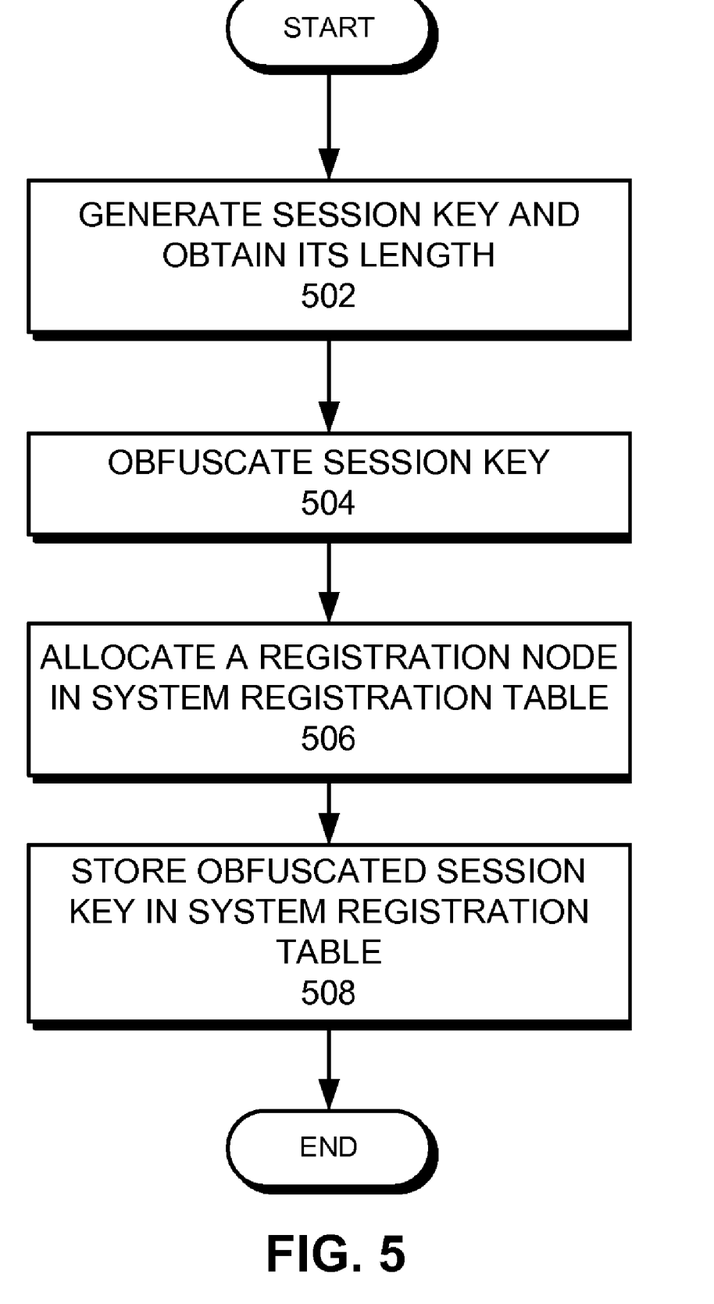
FIG. 5 presents an exemplary flowchart illustrating the process of storing session key at the database server in accordance with one embodiment of the present invention.

FIG. 5 presents an exemplary flowchart for storing a session key at the database server in accordance with one embodiment of the present invention. During operation, the server first generates a session key and obtains the session key's length (operation 502). Subsequently, the server obfuscates the session key (operation 504). In one embodiment, the server can obfuscate the session key with a two-way hash function. The server then allocates a registration node in the system registration table (operation 506) and stores the obfuscated session key in the system registration table (operation 508).

Mutual Authentication

Figure 6:
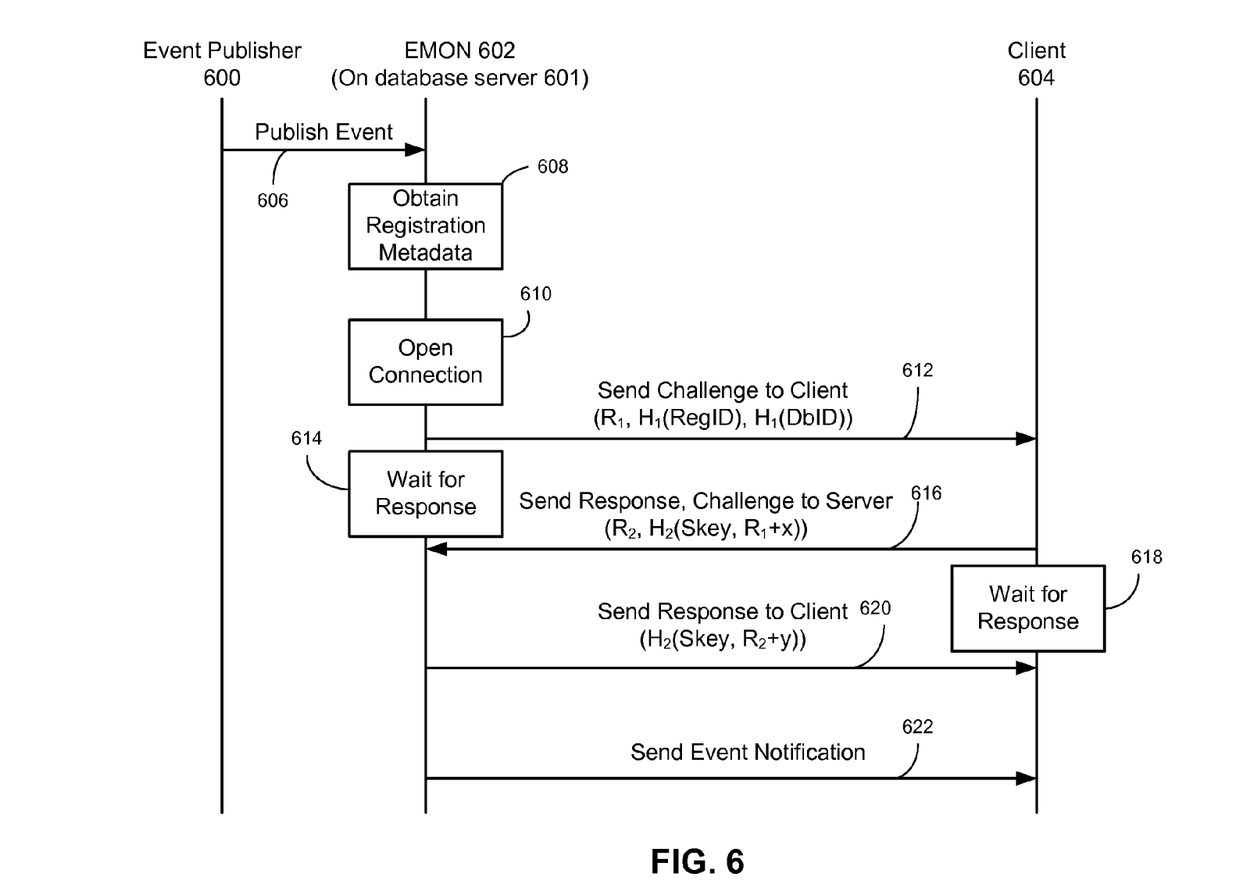
FIG. 6 presents an exemplary state diagram illustrating the process of mutual authentication between a database server and a client in accordance with one embodiment of the present invention.

FIG. 6 presents an exemplary state diagram illustrating the process of mutual authentication between a database server and a client in accordance with one embodiment of the present invention. When a registered event occurs in the database for a registrant (normally the first registered event after registration or instance restart, whichever is later), an event publisher 600 publishes the event to a background EMON 602 running on a database server 601 (operation 606). Subsequently, EMON 602 then accesses the registration metadata through the subscription KGL object (operation 608). EMON 602 accesses the obfuscated session key from the object, and de-obfuscates it. Note that if there is no current active communication channel between the database server 601 and registered client 604 for sending the event notification, EMON 602 initiates a communication channel to client 604 (operation 610).

Subsequently, EMON 602 initiates the mutual authentication process with the client using a challenge-response scheme. EMON 602 running on database server 601 first sends a challenge to client 604 (operation 612). The challenge includes a random number $R_1$, a reversible hash of the registration ID, denoted as $H_1(RegID)$, and a reversible hash of the database ID, denoted as $H_1(DbID)$. The authentication may have different granularities. In one embodiment, a unified session key, which belongs to a registration that occurs before all other registrations, is used for all registrations at a given client location sharing one or more communication channels. As a result, the server only sends the client a random number and a reversible hash of the database ID without sending a reversible hash of the registration ID. However, sometimes it might be difficult to determine which registration occurs first, thus which session key is to be used. Because a client has to be ready to receive notifications as soon as a registration completes on the server (which may happen before the server returns the registration call to the client), and because the registration call may fail during or after its return, when a client does a number of registrations in parallel, the order of registrations seen by the client may be different from that seen by the server. To solve this conflict, in one embodiment of the present invention, all parallel-received session keys are kept by the client. During authentication, one of the session keys is negotiated between the client and sever to be the unified session key, and the remaining session keys are not used. After sending the challenge, EMON 602 waits for a response from client 604 (operation 614). After a predetermined timeout period, if no response from client 604 is received, EMON 602 will not send the event notification.

Upon receiving the challenge from EMON 602, client 604 sends a response along with a challenge back to EMON 602 (operation 616). In order to respond, client 604 uses the received database ID and/or registration ID to retrieve the corresponding session key from its in-memory subscription hash table. Subsequently, client 604 generates an irreversible hash function using both the session key and the server-passed random number $R_1$ (or a variation of the server-passed random number to avoid man-in-the-middle type of attacks). In one embodiment, client 604 calculates the irreversible hash function using a secure hash algorithm, such as SHA-1. Client 604 sends the irreversible hash function, denoted as $H_2$ (Skey, $R_1$+X), as a response, along with another random number $R_2$, as a challenge, back to EMON 602. X is a number pre-agreed between the server and client. In one embodiment, X is set to one.

After sending the response and the challenge, client 604 waits for a response from EMON 602 (operation 618). After a predetermined timeout period, if no response from EMON 602 is received, client 604 will not complete the communication channel setup and will not receive any notification. By sending the hash function of both the session key and a variation of server-passed random number ($R_1$+X), client 604 authenticates itself to EMON 602 running on database server 601.

After receiving the response along with the challenge from client 604, EMON 602 verifies the client response locally by generating $H_2$(Skey, $R_1$+X) and the corresponding value received from the client. Subsequently, EMON 602 sends a response back to client 604 (operation 620). To respond to the challenge from client 604, EMON 602 generates an irreversible hash, denoted as $H_2$ (Skey, $R_2$+Y), using both the session key and the client-passed random number (or a variation of the client-passed random number). Y is a number pre-agreed between the server and client. In one embodiment, Y is set to one. EMON 602 can use the same irreversible hash function, such as SHA-1, as the one used by client 604. By sending an irreversible hash function of both the session key and a variation of the client-passed random number ($R_2$+Y), EMON 602 authenticates itself to client 604. After completing the mutual authentication, EMON 602 running on database server 601 sends the event notification to client 604 (operation 622).

Note that by hashing the registration ID and the database ID, the database server prevents these IDs from being obtained by spoofing malicious users. The reversible hash of the registration ID cannot be used in a replay attack by a malicious user acting a server, because the server is also required to be authenticated. In addition, irreversibly hashing the session key together with random numbers also prevents replay attacks from malicious users.

Depending on the preferred performance and required security level, the mutual authentication between the database server and the client can occur at different frequencies. For faster performance, the authentication is performed only once when setting up a communication channel for a first notification. On the other hand, the authentication can be performed once for a number of notifications in order to achieve greater security. In one embodiment, when multiple registrations are receiving notifications on the same communication channel, the mutual authentication is performed for every registration on the communication channel. In another embodiment, when multiple registrations are receiving notifications on the same communication channel, the mutual authentication is performed for the first registration on that communication channel only.

In certain scenarios, the client receiving notifications may be known and secure, or the client and the database server may reside on the same side of a firewall. Therefore, in order to achieve faster performance, the database server may choose to bypass the mutual authentication process. In one embodiment of the present invention, a switch is included in the database server and/or client to turn on and off the authentication process.

The client may want to control the authentication granularity and frequency, and to turn on and off the authentication. In one embodiment of the present invention, a user interface is provided to enable the client control. Depending on the performance requirement, a client can also choose a public authentication algorithm.

The aforementioned mutual authentication scheme implies a change in the client-server communication protocol and hence it may or may not work with older versions of client/server installations. As a result, the server and the client might need to know whether mutual authentication is available before using the scheme. In one embodiment, the server first checks for client capability and uses the mutual authentication scheme only if the client is capable of authentication. Otherwise, the server communicates with the client using the existing protocol without authentication. Similarly, the client checks server capability to decide whether or not to use authentication. Because one client may communicate with multiple database servers among which some are authentication-capable and some are not, the listener spawned by the client (that waits indefinitely for notifications) can use a different wait mechanism. Instead of waiting indefinitely, the listener can periodically check for authentication requests from authentication-capable servers.

Older versions of database server/client installation can operate seamlessly with newer-version authentication-capable ones. In one embodiment, a database server can obtain a client's authentication capability either from session context or version information passed during registration. On the other hand, a client can obtain a database server's authentication capability, and only keep session keys for and accept authenticated communication channels from authentication-capable database servers. Database servers and clients that are not authentication capable can continue to establish unauthenticated communication channels using existing protocol.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A database server that facilitates securing database event notifications, the database server comprising:
   a processor;
   a session key management mechanism configured to create and store a session key on the database server when a client registers for an event;
   a data accessing mechanism configured to access registration metadata to obtain the session key when the event occurs;
   a first sending mechanism configured to send to the client a first random number, a first reversible hash function based on an event identifier, and a second reversible hash function based on a database identifier;
   a receiving mechanism configured to receive from the client a response including an irreversible hash function based on both the session key and the first random number;
   a mutual authentication mechanism configured to mutually authenticate the client and the database server based on the session key during event notification; and
   an event notification mechanism configured to send the event notification to the client.

2. The database server of claim 1, further comprising an obfuscation mechanism configured to obfuscate the session key before storing it.

3. The database server of claim 1, wherein the session key is stored in a system registration table.

4. The database server of claim 1, wherein the event identifier identifies a respective event registration and the database identifier identifies a respective database.

5. The database server of claim 4, wherein the response from the client further includes a second random number.

6. The database server of claim 5, wherein the mutual authentication mechanism further comprises a second sending mechanism configured to send to the client a response including an irreversible hash function based on both the session key and the second random number.

7. A database client that facilitates securing database event notifications, the database client comprising:
   a processor;
   a session key management mechanism configured to receive and store a session key from a database server when the client registers at the database server for notification of one or more events;
   a first receiving mechanism configured to receive from the database server a first random number, a first reversible hash function based on an event identifier, and a second reversible hash function based on a database identifier;
   a sending mechanism configured to send to the database server a response including an irreversible hash function based on both the session key and the first random number;
   a mutual authentication mechanism configured to mutually authenticate the client and the database server based on the session key during event notification; and
   an event notification receiving mechanism configured to receive the event notification from the database server.

8. The database client of claim 7, wherein the session key is stored in an in-memory hash table on the client.

9. The database client of claim 7, wherein the event identifier identifies a respective event registration and the database identifier identifies a respective database.

10. The database client of claim 9, wherein the mutual authentication mechanism further comprises:
    a sending mechanism configured to send a second random number and an irreversible hash function based on both the session key and the first random number; and
    a second receiving mechanism configured to receive a response from the server an irreversible hash function based on both the session key and the second random number.

11. A computer executed method for securing database event notifications, the method comprising:
    creating a session key at a database server when a client registers for an event;
    storing the session key on the database server;
    accessing registration metadata on the database server to obtain the session key when the event occurs;
    sending to the client a first random number, a first reversible hash function based on an event identifier, and a second reversible hash function based on a database identifier;
    receiving from the client a response including an irreversible hash function based on both the session key and the first random number;
    mutually authenticating the client and the database server based on the session key during event notification; and
    sending the event notification to the client.

12. The method of claim 11, further comprising obfuscating the session key before storing it.

13. The method of claim 11, wherein the session key is stored in a system registration table.

14. The method of claim 11, wherein the event identifier identifies a respective event registration and the database identifier identifies a respective database.

15. The method of claim 14, wherein the response from the client further includes a second random number.

16. The method of claim 15, wherein mutually authenticating the client and database server further comprises sending to the client a response including an irreversible hash function based on both the session key and the second random number.

17. A computer executed method for securing database event notifications, the method comprising:
    receiving a session key from a database server when a client registers at the database server for notification of one or more events;
    storing the session key on the client;
    receiving from the database server a first random number, a first reversible hash function based on an event identifier, and a second reversible hash function based on a database identifier;
    sending to the database server a response including an irreversible hash function based on both the session key and the first random number;
    mutually authenticating the client and the database server based on the session key during event notification; and
    receiving event notification from the database server.

18. The method of claim 17, wherein the session key is stored in an in-memory hash table on the client.

19. The method of claim 17, wherein the event identifier identifies a respective event registration and the database identifier identifies a respective database.

20. The method of claim 19, wherein mutually authenticating the client and database server further comprises:

sending a second random number and an irreversible hash function based on both the session key and the first random number; and receiving a response from the server an irreversible hash function based on both the session key and the second random number.

21. A non-transitory computer-readable storage medium storing instructions which when executed by a computer cause the computer to perform a method for securing database event notifications, the method comprising:

creating a session key at a database server when a client registers for an event;

storing the session key on the database server;

accessing registration metadata on the database server to obtain the session key when the event occurs;

sending to the client a first random number, a first reversible hash function based on an event identifier, and a second reversible hash function based on a database identifier;

receiving from the client a response including an irreversible hash function based on both the session key and the first random number;

mutually authenticating the client and the database server based on the session key during event notification; and sending the event notification to the client.

22. The non-transitory computer-readable storage medium of claim 11, wherein the method further comprises obfuscating the session key before storing it.

23. The non-transitory computer-readable storage medium of claim 11, wherein the session key is stored in a system registration table.

24. The non-transitory computer-readable storage medium of claim 11, wherein the event identifier identifies a respective event registration and the database identifier identifies a respective database.

25. The non-transitory computer-readable storage medium of claim 14, wherein the response from the client further includes a second random number.

26. The non-transitory computer-readable storage medium of claim 15, wherein mutually authenticating the client and database server further comprises sending to the client a response including an irreversible hash function based on both the session key and the second random number.

27. A non-transitory computer-readable storage medium storing instructions which when executed by a computer cause the computer to perform a method for securing database event notifications, the method comprising:

receiving a session key from a database server when a client registers at the database server for notification of one or more events;

storing the session key on the client;

receiving from the database server a first random number, a first reversible hash function based on an event identifier, and a second reversible hash function based on a database identifier;

sending to the database server a response including an irreversible hash function based on both the session key and the first random number;

mutually authenticating the client and the database server based on the session key during event notification; and receiving event notification from the database server.

28. The non-transitory computer-readable storage medium of claim 17, wherein the session key is stored in an in-memory hash table on the client.

29. The non-transitory computer-readable storage medium of claim 17, wherein the event identifier identifies a respective event registration and the database identifier identifies a respective database.

30. The non-transitory computer-readable storage medium of claim 19, wherein mutually authenticating the client and database server further comprises:

sending a second random number and an irreversible hash function based on both the session key and the first random number; and receiving a response from the server an irreversible hash function based on both the session key and the second random number.

\* \* \* \* \*

UNITED STATES PATENT AND TRADEMARK OFFICE
CERTIFICATE OF CORRECTION

PATENT NO.        : 8,069,155 B2                                      Page 1 of 1
APPLICATION NO.   : 12/350055
DATED             : November 29, 2011
INVENTOR(S)       : Saxena et al.

It is certified that error appears in the above-identified patent and that said Letters Patent is hereby corrected as shown below:

On sheet 2 of 6, in figure 2, below box No. 202, line 2, delete "OCCURENCE" and insert -- OCCURRENCE --, therefor.

In column 5, line 15, delete "More over," and insert -- Moreover, --, therefor.

In column 5, line 64, delete "sever" and insert -- server --, therefor.

In column 6, line 57, delete "sever" and insert -- server --, therefor.

Signed and Sealed this
Thirteenth Day of March, 2012

David J. Kappos
*Director of the United States Patent and Trademark Office*